United States Patent [19]
Freeman

[11] Patent Number: 5,151,686
[45] Date of Patent: Sep. 29, 1992

[54] ELECTRONIC BRUSH GENERATION

[75] Inventor: Stephen Freeman, Bedfordshire, England

[73] Assignee: Crosfield Electronics Limited, England

[21] Appl. No.: 650,541

[22] Filed: Feb. 5, 1991

[30] Foreign Application Priority Data

Feb. 5, 1990 [GB] United Kingdom ................ 9002475

[51] Int. Cl.$^5$ .............................................. G09G 1/28
[52] U.S. Cl. .................................... 340/703; 395/132
[58] Field of Search ................ 340/725, 703; 395/132, 395/130, 124, 120, 117, 119, 128, 126, 139

[56] References Cited

U.S. PATENT DOCUMENTS 4,633,416  12/1986  Walker ................................ 340/798
5,079,721  1/1992   Gershony ........................... 395/132

Primary Examiner—Jeffery A. Brier
Assistant Examiner—A. Au
Attorney, Agent, or Firm—Sughrue, Mion, Zinn, Macpeak & Seas

[57] ABSTRACT

Apparatus for creating or modifying an electronically represented image comprising a display (30); a store (11) for storing arrays of data values defining electronic brushes; an input device (5) to enable an operator to control movement of a previously defined brush on the display; and a processor (1) responsive to the input device (5) to move an electronic brush selected from the store across the displays (30) so as to create or modify an electronically represented image. The processor (1) is also adapted to generate and store a representation of the profile of an electronic brush for use subsequently to create or modify electronically an image, in which a previously defined brush is used to define an array of pixels at a first resolution having a shape corresponding to the new brush, the previously defined brush comprising an array of pixels for each of which a value is stored. The processor (1) stores a value for each pixel of the new array computed from the values of the or each pixel of the previously defined brush which passes through the new array pixel during movement of the previously defined brush.

6 Claims, 3 Drawing Sheets

"CREATION" BRUSH

FIG. 3

| | | | 5 | | | |
|---|---|---|---|---|---|---|
| | | 5 | 60 | 5 | | |
| | 5 | 60 | 150 | 60 | 5 | |
| | | 5 | 60 | 5 | | |
| | | | 5 | | | |
| | | | | | | |

"CREATION" BRUSH

FIG. 4

| | | | 5 | | | |
|---|---|---|---|---|---|---|
| | 10 | 10 | 10 | 10 | 5 | 1 |
| | 100 | 150 | 200 | 100 | 10 | 5 |
| | 50 | 100 | 100 | 50 | 5 | |
| | | 50 | 50 | 30 | 5 | |
| | | | | | | |

"NEW" BRUSH

ELECTRONIC BRUSH GENERATION

FIELD OF THE INVENTION

The invention relates to methods and apparatus for generating and storing a representation of the profile of an electronic brush for use subsequently to create or modify electronically an image.

DESCRIPTION OF THE PRIOR ART

In the field of electronic image generation, it is common for the image generation apparatus to provide the operator with a selection of brush shapes and profiles. In this context, the shape of the brush is defined by an array of pixels while the brush profile is defined by the data values stored within each pixel. These data values are used subsequently to control the degree of mixing between a chosen brush colour or a patch of some image and the image that the brush is applied to. It is common for an operator to wish to generate his own brush shape and profile and existing systems permit a limited range of such "custom" brushes to be created In general, the user is able to define the shape of the brush and a profile having a binary form. The problem with these custom brush techniques is that they often produce aliased results.

Representing a smooth, multi-bit density profile, and creating anti-aliased edges is usually clumsily achieved by brush making tools currently existing. Artists will typically use this tool to create brush shapes that suit their needs—e.g. maybe a "snowflake" style pattern, or just an oblique stroke, but usually the profile must be smooth and anti-aliased.

SUMMARY OF THE INVENTION

In accordance with one aspect of the present invention, a method of generating and storing a representation of the profile of an electronic brush for use subsequently to create or modify electronically an image including the steps of electronically moving a previously defined brush to create an array of pixels having a shape corresponding to a new brush, wherein the previously defined brush comprises an array of pixels for each of which a value is stored, and wherein a value is stored for each pixel of the new array computed in accordance with a predetermined algorithm from the values of the or each pixel of the previously defined brush which passes through the new array pixel during movement of the previously defined brush.

In accordance with a second aspect of the present invention, apparatus for creating or modifying an electronically represented image comprises a display; a store for storing arrays of data values defining electronic brushes; an input device to enable an operator to control movement of a previously defined brush on the display; and processing means responsive to the input device to move an electronic brush selected from the store across the display so as to create or modify an electronically represented image, the processing means also being adapted to generate and store a representation of the profile of an electronic brush for use subsequently to create or modify electronically an image, in which a previously defined brush is used to define an array of pixels at a first resolution having a shape corresponding to the new brush, the previously defined brush comprising an array of pixels for each of which a value is stored, and wherein the processing means stores a value for each pixel of the new array computed from the values of the or each pixel of the previously defined brush which passes through the new array pixel during movement of the previously defined brush.

We have devised a new technique for generating and storing "custom" brushes in which a previously defined brush is used. This leads to a particularly simple way of creating brushes which does not suffer from the limitations of the known systems.

Preferably, the previously defined brush has an anti-aliased profile such that the new brush will also have an anti-aliased profile Typically, therefore at least those pixels at the edge of the previously defined brush will contain values selected from a scale of three or more such values. This particularly advantageous feature overcomes the problems of the binary style custom brushes which have been available up until now. The previously defined brush could have a gaussian density profile or generally constant density with an anti-aliased edge for example.

In some cases, when a previously defined brush pixel coincides with a new brush pixel, the new brush pixel value can be made to be equal to the previously defined brush pixel. Alternatively, the new brush pixel can be computed from some combination of previously defined brush pixels. In particular, if the previously defined brush is repeatedly moved across the same new brush pixel then the new brush pixel value can be modified from its previous value upon each new pass of the previously defined brush.

Preferably, the method further comprises reducing the resolution of the new brush pixel array to a second, coarser resolution after the new brush pixel values have been computed. Typically, the new brush can be constructed by displaying on the display a large array of pixels but when the new brush is to be used, this array will be generally too large and thus has to be reduced in size or resolution. One method for reducing the resolution of the new brush pixel is to average the data values in groups of the first resolution pixels.

BRIEF DESCRIPTION OF THE DRAWINGS

An example of an apparatus and a method according to the present invention will now be described with reference to the accompanying drawings in which:

FIG. 3 illustrates an array of pixels containing intensity values to define a creation brush profile.

FIG. 4 illustrates an array of pixels containing intensity values to define a new brush profile.

DETAILED DESCRIPTION OF AN EMBODIMENT

Figure 1:
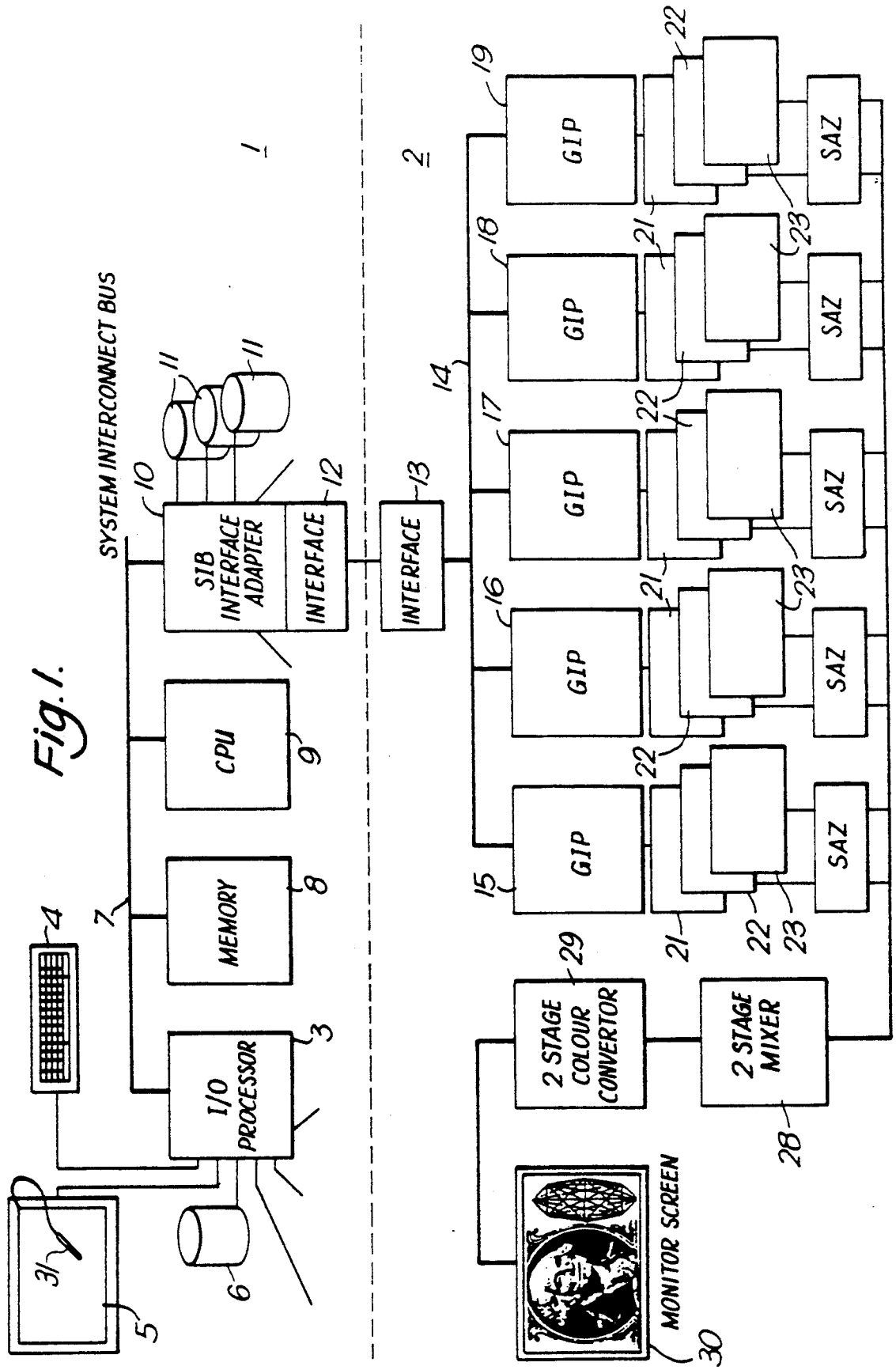
FIG. 1 is a block diagram of the apparatus.

The apparatus shown in FIG. 1 can be divided into two primary parts. These comprise the host 1 and the graphics sub-system 2. The division is shown in FIG. 1 by a dashed line. The host 1 is a 68020 microprocessor based system running UNIX which is a multi-tasking, multi-user operating system. The host comprises an I/O processor 3 coupled to a keyboard 4, a digitizing tablet 5 and associated pen 31, a system disk 6 and other data sources (not shown). The I/O processor 3 is connected to a system inter-connect bus (SIB) 7 which is connected to ROM and RAM memory 8, a CPU 9, and an interface adapter 10. The interface adapter 10 is connected to a number of high speed image discs 11 which hold data defining the colour content of pixels of images at high resolution, the adapter also being connected via an interface 12 with the graphics sub-system 2. As mentioned above, the host has a conventional form and will not be described in detail. However, the SIB 7 is described in more detail in EP-A-0332417.

The programme that runs on the host is a single "process" which reads and processes inputs from the digitizing tablet 5 under operator control and directs the graphics part 2 to display the host's responses to those inputs on the graphics monitor 30. Essentially, the system takes advantage of the host system in being able to perform a majority of the calculations so that only a small amount of control data is passed to the graphics sub-system. This graphics part 2 is much better than the host 1 at creating and manipulating graphical objects but the host is better at controlling input/output to peripherals, discs and tapes and is relatively easy to programme.

The graphics sub-system 2 comprises an interface 13 which connects the graphics part to the host 1, the interface 13 being connected to a bus 14. The bus 14 is connected to five graphics image processors (GIPs) 15-19. In this embodiment, it is assumed that the images are defined by four colour components, namely cyan, magenta, yellow and black, there being a separate GIP for each colour. Thus, the GIP 15 processes the cyan colour component, the GIP 16 the magenta colour component, the GIP 17 the yellow colour component and the GIP 18 the black colour component. If the image was represented by a different number of colour components, for example red, green and blue then only three of the GIPs would be needed. The advantage of providing the GIPs 15-18 in parallel is that each component of each pixel in the image can be processed in parallel so that the overall processing time is reduced by up to four times over the processing time with a single processor. A further advantage of using the GIPs is that each has a bit-slice processor on which the programmer can define instructions useful for a particular application.

A fifth GIP 19 is provided for defining one or more masks and other features.

Figure 2:
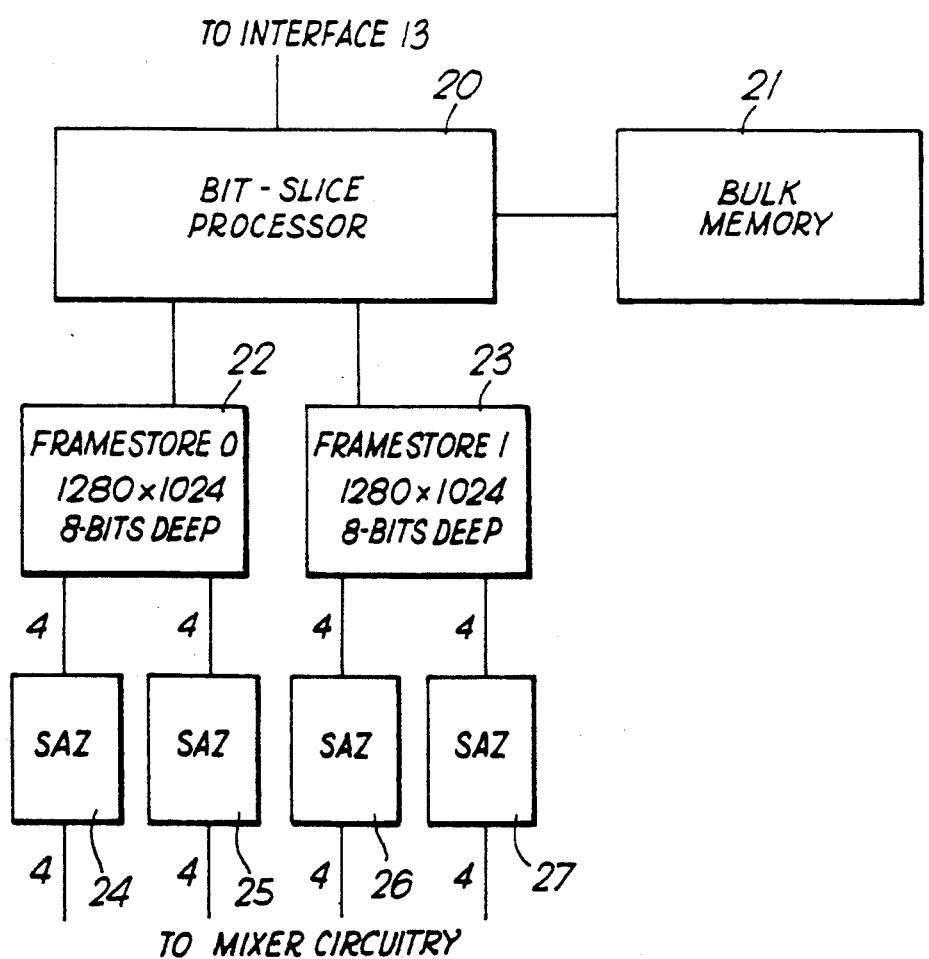
FIG. 2 is a block diagram of a graphics image processor of FIG. 1.

The construction of one of the GIPs of FIG. 1 is shown in FIG. 2. Each GIP comprises a bit-slice processor 20 coupled to bulk memory 21. This memory 21 will hold image data, brush profiles and text as required and is used as virtual image memory.

The bit-slice processor 20 is also connected to a pair of framestores 22, 23 each of which has dimensions $1280 \times 1024$ and is 8 bits deep. In the GIPs 15-18, each framestore will hold 8 bit colour data while in the mask GIP 19 each framestore can be used to hold 8 bit masks or two separate 4 bit masks. Furthermore, one of the framestores in the GIP 19 can be used to display menus in one four bit plane and overlays in the other four bit plane. Overlays comprise construction lines and boxes and the like which are to be displayed on the monitor.

The eight bit data in each framestore 22, 23 is applied in four bit "nibbles" to respective scroll, amplify and zoom circuits 24-27 which operate in a conventional manner to perform one or more of the functions of scroll, zoom and amplify, the outputs from these circuits being fed to a mixer circuit 28. The circuit 28 mixes the data from each of the framestores 22 associated with, the GIPs 15-18 with the data from each of the framestores 23 associated with the GIPs 15-18 in accordance with the mask stored in the framestore 22 of the GIP 19. This mixer circuit which operates in two stages is described in more detail in EP-A-0344976.

The output from the mixer circuit 28 is fed to a two stage colour converter 29 which converts the four colour component data to three colour component data e.g. red, green and blue suitable for controlling the display on a monitor screen 30.

In use, images are stored on the high speed image disks and these images may have been generated by scanning original transparencies or other representations or they may have been created electronically using an electronic paint brush. The host 1 causes relevant portions of these images to be "paged" in and out of the bulk memory 21 in the GIPs 15-18 and brush profiles to be loaded and unloaded from the bulk memory 21 in the GIP 19. The interface adaptor 10 has its own 68020 processor to allow it independently to control the disks 11. The GIPs 15-18 are directed by the host 1 to do various things to images in the bulk memory 21 so that when a GIP attempts to access an address in an image that is not currently in its bulk memory then part of that memory is written back to disc and a new portion read in. After the GIPs have finished processing, the data in the framestores is then scrolled, zoomed and/or amplified as necessary, mixed in the circuit 28, converted to monitor format and then displayed.

If the host 1 wishes to display menus on the screen, these are drawn into the mask GIP framestore 23, known as the "overlay plane".

In normal operation, in order to create an image on the monitor 30, the operator selects a particular colour and, a previously defined brush. The host 1 computes a raster pattern for the selected brush from prestored parameters and this is then stored in a special portion of the bulk memories 21 of the GIPs 15-19. The operator then moves the pen 31 relative to the tablet 5 which results in a corresponding line of the selected colour being drawn on the monitor 30 via the graphics part 2. This is achieved by loading appropriate digital data defining the colour density at the appropriate positions in the framestores 22.

If the operator wishes to define his own brush shape and profile he enters a "custom brush" mode and selects a previously defined brush (which may include a previously defined custom brush) from the store !1 which he wishes to use to generate the new brush, and a maximum density value (D Max %).

Initially, the framestores 22 are cleared so that a blank screen is displayed on the monitor 30. This "blank" will typically be coloured pure black. The brush selected by the operator is then moved about the monitor screen 30 by the operator moving the pen 31 across the digitizing tablet 5. At each position of the brush the host 1 computes new pixel values, as will be described below, these new pixel values then being stored in the bulk memory 21 of the GIP 18 to constitute the profile of the new, custom brush. Thus, at each position of the previously selected brush (FIG. 3), which may be defined to sub-pixel accuracy, the host 1 computes new values for the pixels which coincide with each brush pixel in accordance with the formula:

New pixel value $= a \times$ brush pixel density $+ (1-a)$ old pixel density where $a = D_{MAX} \times$ old brush pixel value.

The current appearance of the brush being created will be displayed on the monitor 30 (FIG. 4) and once the operator is satisfied with the appearance he will indicate this to the host 1 via the keyboard 4 and the current brush profile will be stored in the disks 11.

In a preferred example, the effect of the previously selected brush can be varied in accordance with the pressure by which the pen 31 is applied on the tablet 5 so hat the parameter a is defined as $$a = D_{MAX} \times \text{pen pressure} \times \text{old brush pixel value}.$$

Typically, the previously selected brush will have dimensions of 25×25 pixels while the new brush shape can be created at a resolution of up to say 512×512 pixels. When the user wishes subsequently to use the created brush, he will define the brush size required and the host 1 will then compute the appropriate raster pattern for example using a fully interpolated microcode routine and then download the pattern to the bulk memories 21.

I claim:

1. A method of generating and storing a representation of the profile of an electronic brush for use subsequently to create or modify electronically an image, the method comprising the steps of electronically moving a previously defined brush to create an array of pixels having a shape corresponding to a new brush profile, wherein the previously defined brush profile comprises an array of pixels for each of which a value is stored, and wherein a value is stored for each pixel of the new array of the new brush profile computed in accordance with a predetermined algorithm from the values of the or each pixel of the previously defined brush profile which passes through the new array pixel during movement of the previously defined brush.

2. A method according to claim 1 wherein the previously defined brush has an anti-aliased profile such that the new brush also has an anti-aliased profile.

3. A method according to claim 2, wherein at least those pixels at the edge of the previously defined brush contain values selected from a scale of three or more such values.

4. A method according to claim 1, wherein the value associated with a new brush pixel is re-computed each time the previously defined brush passes across the new brush pixel.

5. A method according to claim further comprising reducing the resolution of the new brush pixel array to a second, coarser resolution after the new brush pixel values have been computed.

6. Apparatus for creating or modifying an electronically represented image, the apparatus comprising a display; a store for storing arrays of data values defining electronic brushes; an input device to enable an operator to control movement of a previously defined brush on the display; and processing means responsive to the input device to move an electronic brush selected from the store across the display so as to create or modify an electronically represented image, the processing means also being adapted to create or modify, and store a representation of the profile of an electronic brush for use subsequently to create or modify electronically an image, said new brush profile created or modified by a previously defined brush which defines an array of pixels having a shape corresponding to the new brush profile the previously defined brush profile comprising an array of pixels for each of which a value is stored, and wherein the processing means stores a value for each pixel of the new array of the new brush profile computed from the values of the or each pixel of the previously defined brush profile which passes through the new array pixel during movement of the previously defined brush.

* * * * *